United States Patent
Yoshimura et al.

(10) Patent No.: US 9,841,099 B2
(45) Date of Patent: Dec. 12, 2017

(54) AUTOMATIC TRANSMISSION CONTROL APPARATUS

(71) Applicant: HONDA MOTOR CO., LTD., Tokyo (JP)

(72) Inventors: Yusuke Yoshimura, Wako (JP); Hideaki Yamashita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 294 days.

(21) Appl. No.: 14/795,237

(22) Filed: Jul. 9, 2015

(65) Prior Publication Data

US 2016/0017985 A1     Jan. 21, 2016

(30) Foreign Application Priority Data

Jul. 16, 2014   (JP) .................. 2014-146349

(51) Int. Cl.
| | |
|---|---|
| F16H 61/00 | (2006.01) |
| F16H 61/688 | (2006.01) |
| F16H 3/00 | (2006.01) |
| F16H 61/12 | (2010.01) |
| F16H 59/74 | (2006.01) |

(52) U.S. Cl.
CPC ......... *F16H 61/0021* (2013.01); *F16H 3/006* (2013.01); *F16H 61/688* (2013.01); *F16H 2059/746* (2013.01); *F16H 2061/1268* (2013.01)

(58) Field of Classification Search
None
See application file for complete search history.

(56) References Cited

U.S. PATENT DOCUMENTS

| | | |
|---|---|---|
| 5,492,210 A | 2/1996 | Eaton |
| 2002/0151408 A1 | 10/2002 | Nishina et al. |
| 2011/0056317 A1 | 3/2011 | Sato |
| 2011/0303040 A1 | 12/2011 | Hagelskamp |
| 2012/0304816 A1 | 12/2012 | Yagi |

FOREIGN PATENT DOCUMENTS

JP     2013-189993 A     9/2013

OTHER PUBLICATIONS

U.S. Office Action U.S. Appl. No. 14/795,269, dated Nov. 4, 2016.
U.S. Office Action U.S. Appl. No. 14/795,344, dated Feb. 11, 2016.

*Primary Examiner* — Jacob S Scott
(74) *Attorney, Agent, or Firm* — Squire Patton Boggs (US) LLP

(57) ABSTRACT

In an apparatus for controlling an automatic transmission having gear engaging mechanisms installed to engage one of gears to establish n-th speed when supplied with hydraulic pressure discharged from an oil pump driven by a prime mover, an electromagnetic pressure-regulating valve installed to pressure-regulate the hydraulic pressure, an electromagnetic shift valve installed at a hydraulic passage to supply the hydraulic pressure to the gear engaging mechanisms, and a current supply circuit to supply current to the solenoid valve, cut-off of current supply to the solenoid valve from the current supply circuit is delayed by a predetermined time period, when the ignition switch is turned off.

14 Claims, 7 Drawing Sheets

FIG. 4

| MODE | | SHIFT VALVES (CLUTCHES) | | CLUTCHES | | | SHIFT VALVES (GEARS) | | | | GEAR ENGAGING MECHANISM | | | | | | | | NOTE |
|---|---|---|---|---|---|---|---|---|---|---|---|---|---|---|---|---|---|---|---|
| | | SHA | SHB | CL1 | CL2 | RVS | SHC | SHD | SHE | PS1 | PS3 | PS6 | PS8 | PS5 | PS7 | PS2 | PS4 | |
| A | 1 | × | × | A | B | × | × | × | × | × | × | × | × | D | × | × | × | ORDINARY CONDITION |
| | 2 | × | × | A | B | × | × | ○ | ○ | × | C | × | × | × | D | × | × | |
| | 3 | × | × | A | B | × | × | ○ | × | C | × | × | × | D | × | × | × | |
| | 4 | × | × | A | B | × | ○ | ○ | ○ | C | × | × | × | × | D | × | × | |
| | 5 | × | × | A | B | × | ○ | × | × | × | × | C | C | × | × | D | × | |
| | 6 | × | × | A | B | × | ○ | ○ | ○ | × | C | C | × | × | × | D | × | |
| | 7 | × | × | A | B | × | ○ | ○ | × | × | × | × | C | × | × | × | D | |
| | 8 | × | × | A | B | × | ○ | ○ | ○ | × | × | × | C | × | × | D | × | |
| B | 1 | × | ○ | A | × | × | × | × | × | × | × | × | × | × | × | × | × | LSD FAILED CONDITION (LSD OUTPUT PRESSURE IS SHUT OFF BY ENERGIZING SHB) |
| | 2 | × | ○ | A | × | B | × | ○ | ○ | C | C | × | × | × | × | × | × | |
| | 3 | × | ○ | A | × | × | × | ○ | × | C | × | × | B | × | × | × | × | |
| | 4 | × | ○ | A | × | B | ○ | ○ | ○ | × | × | C | C | × | × | × | × | |
| | 5 | × | ○ | A | × | × | ○ | × | × | × | × | C | C | × | × | × | × | |
| | 6 | × | ○ | A | × | × | ○ | ○ | ○ | × | × | B | C | × | × | × | × | |
| | 7 | × | ○ | A | × | × | ○ | ○ | × | × | × | × | × | × | × | × | × | |
| | 8 | × | ○ | A | × | × | ○ | ○ | ○ | × | × | × | × | × | × | × | × | |
| C | 1 | ○ | × | × | B | × | × | × | × | × | × | × | × | D | × | × | × | LSC FAILED CONDITION (LSC OUTPUT PRESSURE IS SHUT OFF BY ENERGIZING SHA) |
| | 2 | ○ | × | × | B | × | × | ○ | ○ | × | × | × | × | A | D | × | × | |
| | 3 | ○ | × | × | B | × | × | ○ | × | × | × | × | × | D | × | × | × | |
| | 4 | ○ | × | × | B | × | ○ | ○ | ○ | × | × | × | × | A | D | × | × | |
| | 5 | ○ | × | × | B | × | ○ | × | × | × | × | × | × | × | × | × | D | |
| | 6 | ○ | × | × | B | × | ○ | ○ | ○ | × | × | × | × | A | × | D | × | |
| | 7 | ○ | × | × | B | × | ○ | ○ | × | × | × | × | × | × | × | × | D | |
| | 8 | ○ | × | × | B | × | ○ | ○ | ○ | × | × | × | × | A | × | D | × | |

AUTOMATIC TRANSMISSION CONTROL APPARATUS

CROSS-REFERENCE TO RELATED APPLICATION

This application is based upon and claims the benefit of priority from Japanese Patent Application No. 2014-146349 filed on Jul. 16, 2014, the contents of which are incorporated herein by reference.

BACKGROUND OF THE INVENTION

Field of the Invention

This invention relates to an automatic transmission control apparatus, specifically to an apparatus for controlling supply of current to electromagnetic control valves (solenoid valves) of an automatic transmission when an ignition switch is turned off.

Description of Related Art

The recently-appearing double-clutch (twin-clutch) automatic transmission described in Patent Document 1 (Japanese Laid-Open Patent Application No. 2013-189993), which is installed between an engine or other prime mover mounted on a vehicle and driven wheels, is equipped with: gear engaging mechanisms which when supplied with hydraulic pressure through oil passages from an oil pump driven by the engine can individually alternately engage one of gears with odd-numbered speeds and even-numbered speeds to establish, for example, first to eighth speeds; electromagnetic pressure-regulating valves (linear solenoid valves) disposed in the oil passages; electromagnetic control valves (shift valves) capable of supplying hydraulic pressure controlled by the electromagnetic pressure-regulating valves to the gear engaging mechanisms to select one of the gears and transmit rotation of the prime mover to the wheels, and a current supply circuit for connecting an electric power source through an ignition switch to the electromagnetic control valves.

SUMMARY OF THE INVENTION

In such an automatic transmission, when a driver turns off the ignition switch, supply of current to the electromagnetic control valves is ordinarily cut off immediately. However, since the oil pump is driven by the engine or other prime mover, it continues to be driven to discharge hydraulic pressure until the engine or other prime mover stops, so that one of the gear engaging mechanisms may be operated to engage one of the gears unexpectedly.

The object of this invention is therefore to overcome the aforesaid problem by providing an automatic transmission control apparatus that controls supply of current to the electromagnetic control valves when the ignition switch is turned off, thereby avoiding unexpected gear engagement.

In order to achieve the object, this invention provides in its first aspect an apparatus for controlling an automatic transmission, comprising: gear engaging mechanisms installed between a prime mover mounted on a vehicle and driven wheels to engage one of gears so as to establish n-th speed corresponding to the engaged one of the gears, when supplied with hydraulic pressure discharged from an oil pump driven by the prime mover and sent through a hydraulic passage; an electromagnetic pressure-regulating valve installed at the hydraulic passage to pressure-regulate the hydraulic pressure discharged from the oil pump; an electromagnetic shift valve having a solenoid valve and installed at the hydraulic passage to supply the hydraulic pressure regulated by the electromagnetic pressure-regulating valve to one of the gear engaging mechanisms so as to cause the one of the gears to engage to establish the n-th speed; a current supply circuit connected to the solenoid valve of the electromagnetic shift valve and a power source via an ignition switch to supply current to the solenoid valve; and a current supply cut-off delayer adapted to delay cut-off of current to the solenoid valve supplied from the current supply circuit by a predetermined time period, when the ignition switch is turned off.

In order to achieve the object, this invention provides in its second aspect a method for controlling an automatic transmission, having: gear engaging mechanisms installed between a prime mover mounted on a vehicle and driven wheels to engage one of gears so as to establish n-th speed corresponding to the engaged one of the gears, when supplied with hydraulic pressure discharged from an oil pump driven by the prime mover and sent through a hydraulic passage; an electromagnetic pressure-regulating valve installed at the hydraulic passage to pressure-regulate the hydraulic pressure discharged from the oil pump; an electromagnetic shift valve having a solenoid valve and installed at the hydraulic passage to supply the hydraulic pressure regulated by the electromagnetic pressure-regulating valve to one of the gear engaging mechanisms so as to cause the one of the gears to engage to establish the n-th speed; and a current supply circuit connected to the solenoid valve of the electromagnetic shift valve and a power source via an ignition switch to supply current to the solenoid valve; wherein the method comprises the steps of: delaying cut-off of current to the solenoid valve supplied from the current supply circuit by a predetermined time period, when the ignition switch is turned off.

BRIEF DESCRIPTION OF THE DRAWINGS

The above and other objects and advantages will be more apparent from the following description and drawings, in which:

FIG. 4 is an explanatory diagram showing an operating mode of the hydraulic pressure supply circuit shown in FIG. 2;

DETAILED DESCRIPTION OF THE INVENTION

An automatic transmission control apparatus according to this invention is explained with reference to the attached drawings in the following.

Figure 1:
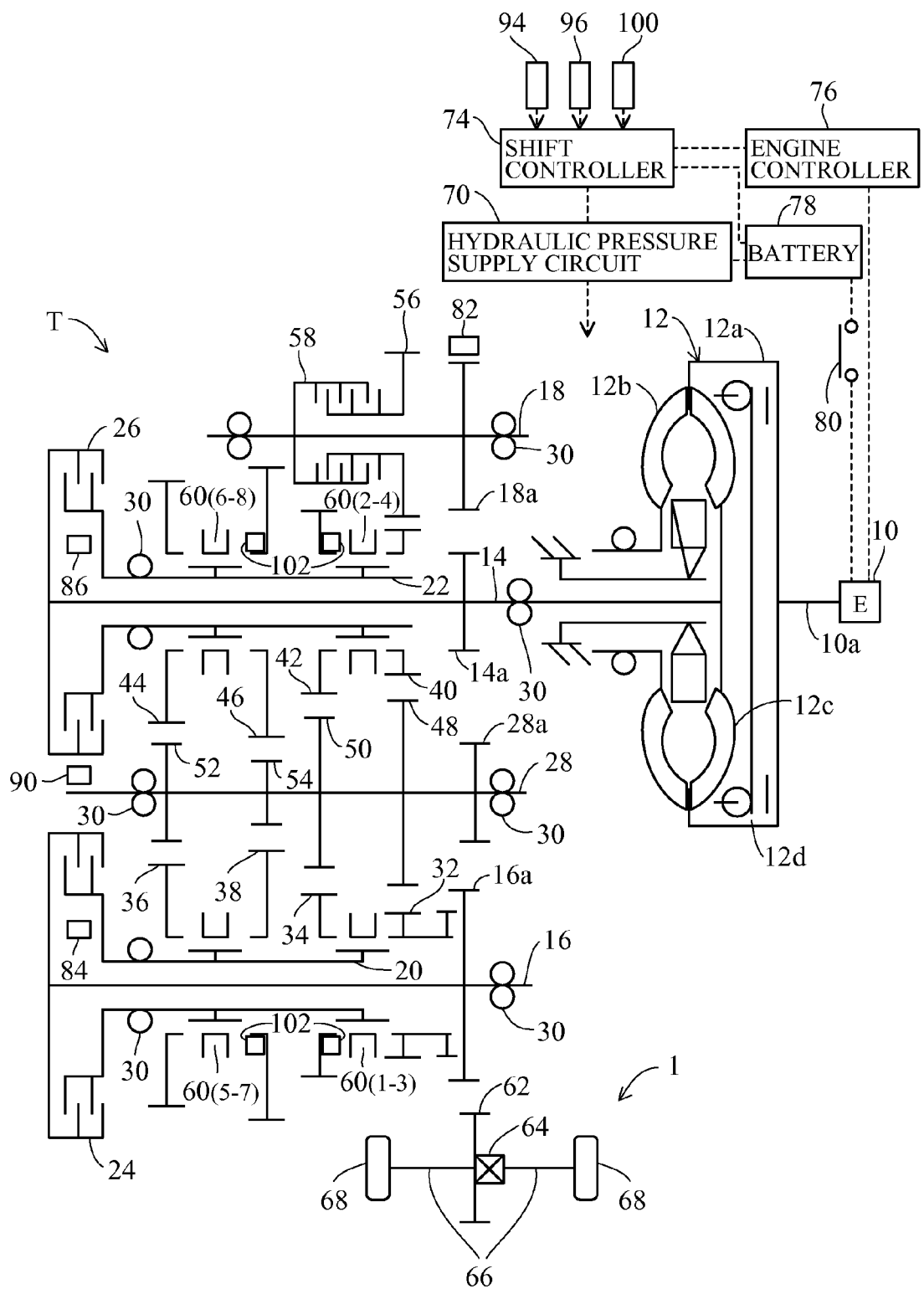
FIG. 1 is an overall schematic view of an automatic transmission control apparatus according to an embodiment of this invention.

FIG. 1 is an overall schematic view of an automatic transmission control apparatus according to an embodiment of this invention.

Now to explain, reference numeral 1 designates a vehicle, and the vehicle 1 is equipped with an automatic transmission (sometimes called "transmission" hereinafter) T. The transmission T is a double-clutch (twin-clutch) transmission with 8 forward-speed gears and 1 reverse-speed gear and has P, R, N and D ranges, for example.

The transmission T is connected through a torque converter 12 to a driveshaft 10a connected to a crankshaft of an engine (prime mover) 10, and is equipped with an even-numbered speed (2, 4, 6 and 8 speed) input shaft (second input shaft) 14 and with an odd-numbered speed (1, 3, 5 and 7 speed) input shaft (first input shaft) 16 parallel to the even-numbered speed input shaft 14. The engine 10 comprises, for example, a gasoline-fueled, spark-ignition internal combustion engine.

The torque converter 12 has a pump impeller 12b fixed on a drive plate 12a directly connected to the driveshaft 10a of the engine 10, a turbine runner 12c fixed on the even-numbered speed input shaft 14, and a lock-up clutch 12d, whereby the driving force (rotation) of the engine 10 is inputted to the even-numbered speed input shaft 14 through the torque converter 12.

An idler shaft 18 is provided in parallel with the even-numbered speed input shaft 14 and odd-numbered speed input shaft 16. The even-numbered speed input shaft 14 is connected to the idler shaft 18 through gears 14a, 18a, and the odd-numbered speed input shaft 16 is connected to the idler shaft 18 through gears 16a, 18a, whereby the even-numbered speed input shaft 14, the odd-numbered speed input shaft 16, and idler shaft 18 rotate together with the rotation of the engine 10.

Further, a first auxiliary input shaft 20 and a second auxiliary input shaft 22 are concentrically installed on the peripheries of the odd-numbered speed input shaft 16 and the even-numbered speed input shaft 14 to be rotatable relative thereto.

The odd-numbered speed input shaft 16 and first auxiliary input shaft 20 are connected through a first clutch (CL1) 24 for odd-numbered speeds and input rotation of the engine 10 through the first clutch 24, while the even-numbered speed input shaft 14 and the second auxiliary input shaft 22 are connected through a second clutch (CL2) 26 for even-numbered speeds and input rotation of the engine 10 through the second clutch 26.

The first and second clutches 24 and 26 comprise both wet multi-plate clutches that operate when supplied with working oil pressure (hydraulic pressure). When the first and second clutches 24 and 26 are supplied with hydraulic pressure and engage (mesh), the first and second auxiliary input shafts 20 are transmitted to the odd-numbered speed and even-numbered speed shafts.

An output shaft 28 is installed between and in parallel with the even-numbered speed input shaft 14 and odd-numbered speed input shaft 16. The even-numbered speed input shaft 14, odd-numbered speed input shaft 16, idler shaft 18 and output shaft 28 are rotatably supported by bearings 30.

On the first auxiliary input shaft 20 on the odd-numbered speed side are fixed a first-speed drive gear 32, a third-speed drive gear 34, a fifth-speed drive gear 36 and a seventh-speed drive gear 38, and on the second auxiliary input shaft 22 on the even-numbered side are fixed a second-speed drive gear 40, a fourth-speed drive gear 42, a sixth-speed drive gear 44 and an eighth-speed drive gear 46.

On the output shaft 28 are fixed a first-second speed driven gear 48 that meshes with the first-speed drive gear 32 and second-speed drive gear 40, a third-fourth speed driven gear 50 that meshes with the third-speed drive gear 34 and fourth-speed drive gear 42, a fifth-sixth speed driven gear 52 that meshes with the fifth-speed drive gear 36 and sixth-speed drive gear 44, and a seventh-eighth speed driven gear 54 that meshes with the seventh-speed drive gear 38 and eighth-speed drive gear 46.

The idler shaft 18 rotatably supports an RVS (reverse) idler gear 56 that meshes with the first-second speed driven gear 48 fixed on the output shaft 28. The idler shaft 18 and the RVS idler gear 56 are connected through an RVS clutch 58. Like the first and second clutches 24 and 26, the RVS clutch 58 is also a wet multi-plate clutch that operates when supplied with hydraulic pressure.

On the odd-numbered speed input shaft 16 are provided a first-third speed gear engaging mechanism 60(1-3) that selectively engages (fixes) the first-speed drive gear 32 and the third-speed drive gear 34 with the first auxiliary input shaft 20, and a fifth-seventh speed gear engaging mechanism 60(5-7) that selectively engages (fixes) the fifth-speed drive gear 36 and the seventh-speed drive gear 38 with the first auxiliary input shaft 20.

On the even-numbered speed input shaft 14 are provided a second-fourth speed gear engaging mechanism 60(2-4) that selectively engages (fixes) the second-speed drive gear 40 and the fourth-speed drive gear 42 with the second auxiliary input shaft 22, and a sixth-eighth speed gear engaging mechanism 60(6-8) that selectively engages (fixes) the sixth-speed drive gear 44 and the eighth-speed drive gear 46 with the second auxiliary input shaft 22. The four gear engaging mechanisms are hereinafter designated collectively by reference symbol 60.

Although not shown in the drawings, two opposed piston chambers corresponding to associated speed gears are provided in each of the four gear engaging mechanisms 60 and linked by a common piston rod (piston) so as to establish a desired speed gear when supplied with hydraulic pressure to the piston chamber on the opposite side, e.g., the first-third speed gear engaging mechanism 60(1-3) is configured to establish third speed when supplied with hydraulic pressure to a third-speed piston chamber.

Although not shown, shift forks are connected to the piston rods. The shift fork is fixed on a fork shaft on which detents (not shown) are drilled at locations corresponding to a central neutral position and left and right in-gear (engaged or meshed) positions. With this, the shift fork can be retained by a detent so that supply of hydraulic pressure is made unnecessary when in the neutral and left/right in-gear positions.

The shift fork is connected to an annular sleeve, and a spline-fitted hub is provided on the inner peripheral side of the sleeve to be movable in the axial direction of the first and second auxiliary input shafts 20, 22. The configuration is such that when the hub moves axially away from the center neutral position, it meshes through a synchronizer ring or the like with dog teeth of the associated drive gear 32, 34, 36, 38, 40, 42, 44, 46 so as to engage the drive gear 32, for example, with the first and second auxiliary input shafts 20, 22.

When the first clutch 24 or the second clutch 26 is engaged (meshed), the driving force of the engine 10 is transmitted from the odd-numbered speed input shaft 16 to the first auxiliary input shaft 20 or from the even-numbered speed input shaft 14 to the second auxiliary input shaft 22 and further to the output shaft 28 through the aforesaid drive gears and driven gears.

During reverse operation, the driving force of the engine 10 is transmitted to the output shaft 28 through the even-numbered speed input shaft 14, gear 14*a*, gear 18*a*, idler shaft 18, RVS clutch 58, RVS idler gear 56, and first-second speed driven gear 48. The output shaft 28 is connected to a differential mechanism 64 through a gear 62, and the differential mechanism 64 is connected to wheels (driven wheels) 68 through drive shafts 66. The vehicle 1 is represented by wheels 68 among other components.

Thus, the automatic transmission T comprises a double-clutch automatic transmission having the input shafts 14, 16, 20, 22 that input rotation of the engine 10 through the first and second clutches 24, 26, the output shaft 28 arranged in parallel to the input shafts, and the gear engaging mechanisms 60 in m number that engage one of gears 32, . . . 54 to the input shafts and the output shaft to establish one of speeds corresponding to the engaged one of the gears from among n (n: 2m) number of speeds.

All of the gear engaging mechanisms 60 are operated when supplied with hydraulic pressure (producing shifting force). A hydraulic pressure supply circuit 70 is provided for supplying hydraulic pressure to the gear engaging mechanisms, first and second clutches 24 and 26, and RVS clutch 58.

Figure 2:
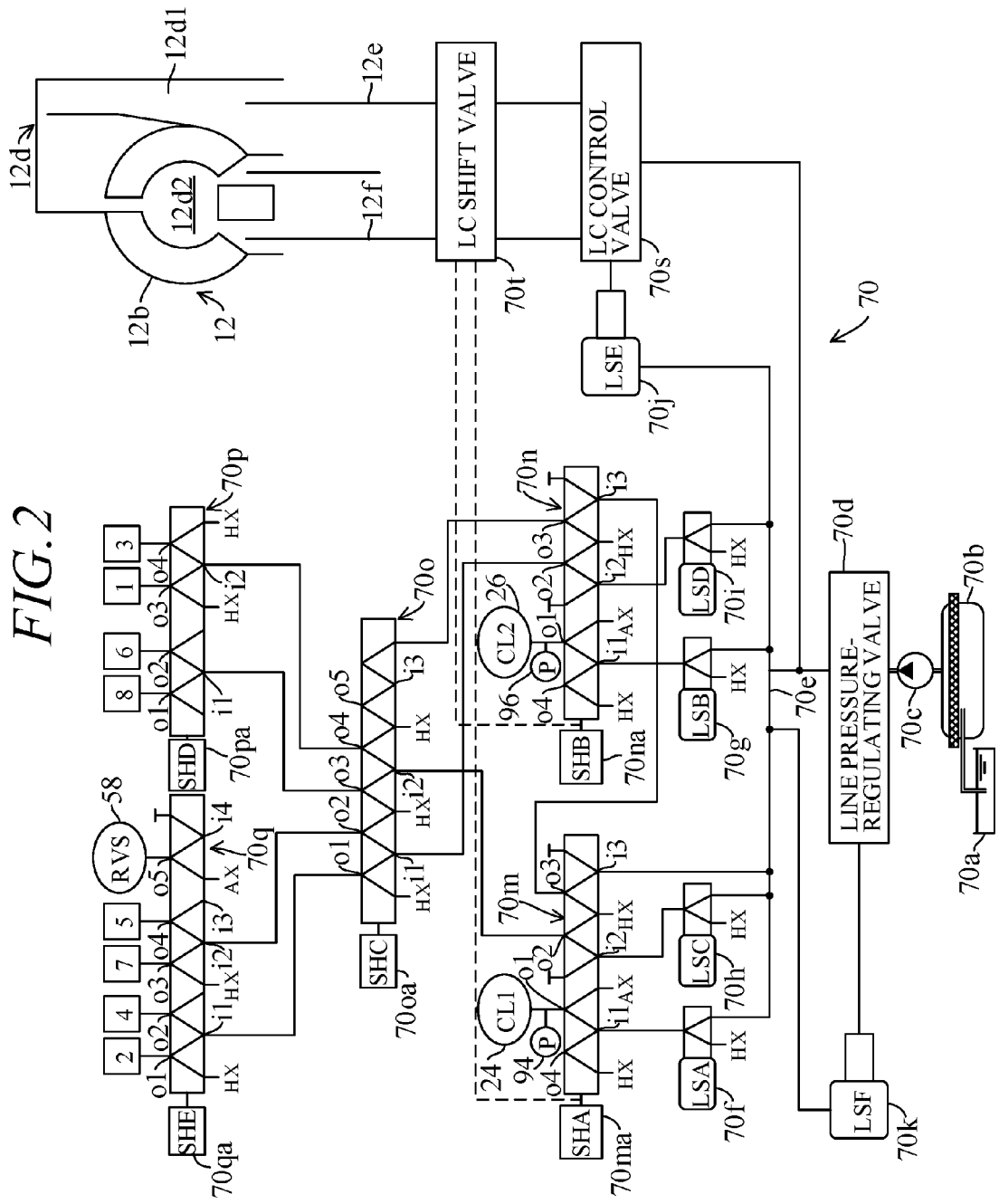
FIG. 2 is a circuit diagram illustrating the structure of a hydraulic pressure supply circuit shown in FIG. 1.
Figure 3:
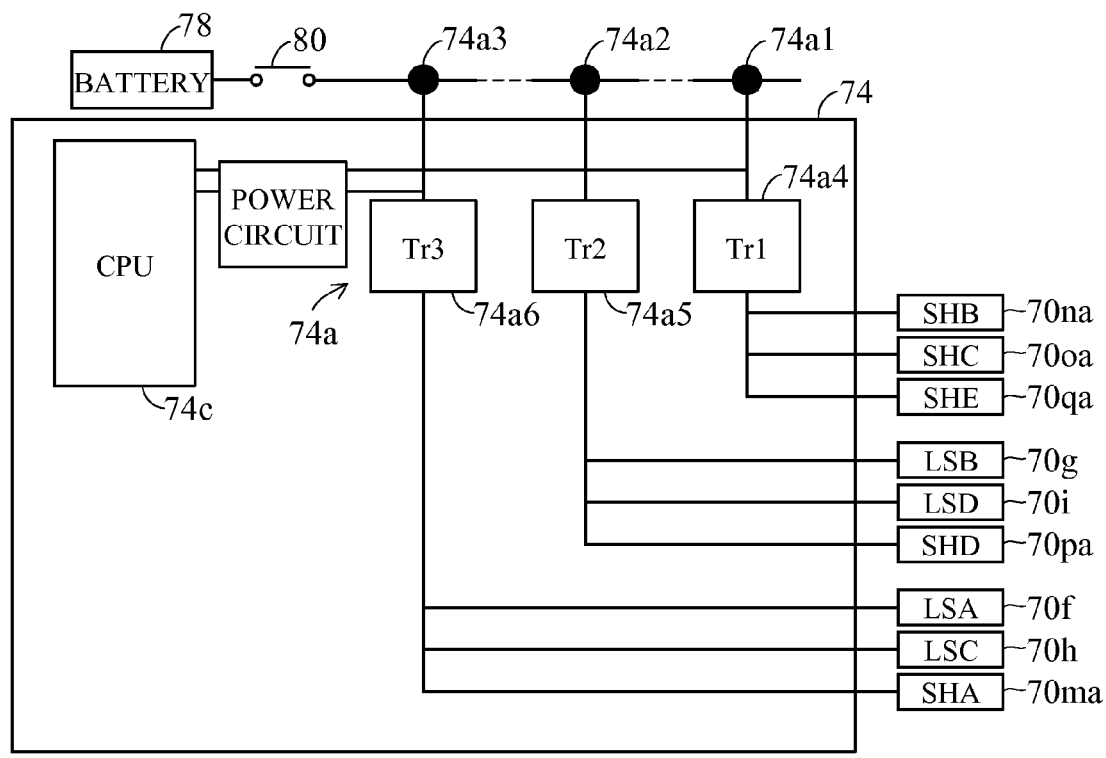
FIG. 3 is a block diagram showing the configuration of a shift controller shown in FIG. 1, with focus on a power source system.

FIG. 2 is a circuit diagram illustrating the structure of the hydraulic pressure supply circuit 70 in detail, FIG. 3 is a block diagram showing the configuration of a shift controller 74 of FIG. 1, with focus on an electric power source system, and FIG. 4 is an explanatory diagram showing an operating mode of the hydraulic pressure supply circuit 70 of FIG. 2.

Explanation will first be made with reference to FIG. 2. In the hydraulic pressure supply circuit 70, the discharge pressure (hydraulic pressure) of hydraulic oil ATF pumped from a reservoir (oil pan formed at the bottom of a transmission case) 70*a* through a strainer 70*b* by an oil pump (oil feed pump) 70*c* is pressure-regulated (depressurized) to line pressure by a line pressure-regulating valve (regulator valve) 70*d*.

Although not illustrated in the drawings, the oil pump 70*c* is connected to the pump impeller 12*b* of the torque converter 12 through a gear so as to be driven for operation by the engine 10.

The line pressure regulated by the line pressure-regulating valve 70*d* is sent through an oil passage (hydraulic passage) 70*e* to input ports of first to sixth linear solenoid valves (pressure-regulating valves), namely, a valve (LSA) 70*f*, a valve (LSB) 70*g*, a valve (LSC) 70*h*, a valve (LSD) 70*i*, a valve (LSE) 70*j*, and a valve (LSF) 70*k*.

The first to fifth linear solenoid valves 70*f* to 70*j* are pressure-regulating valves (electromagnetic pressure-regulating valves) configured as N/C (Normal/Closed) type to have a linear characteristic curve, so that when current flows through the solenoid, a spool is moved in proportion to the current flow to vary the hydraulic pressure inputted from the input port and outputted from its output port (output pressure) linearly, and so that the spool moves to an open position upon passage of current.

The characteristic of the sixth linear solenoid valve (LSF) 70*k* is defined as N/O (Normal/Open) that is differently from that of the first to fifth linear solenoid valves, namely, so that hydraulic pressure is maximum at de-energization and falls upon application current, whereafter the output hydraulic pressure decreases with increasing energization current.

Hydraulic pressure sent to the first linear solenoid valve (LSA) 70*f* is pressure-regulated to clutch pressure (pressure supplied to the first clutch for odd-numbered speeds (CL1) 24) and outputted from the output port thereof, while hydraulic pressure sent to the second linear solenoid valve (LSB) 70*g* is pressure-regulated to clutch pressure (pressure supplied to the second clutch for even-numbered speeds (CL2) 26) and outputted from the output port thereof.

Hydraulic pressure sent to the third linear solenoid valve (LSC) 70*h* is pressure-regulated to gear engaging pressure (pressure supplied to gear engaging mechanisms 60) and outputted from the output port thereof, while hydraulic pressure sent to the fourth linear solenoid valve (LSD) 70*i* is pressure-regulated to gear engagement pressure and outputted from the output port thereof.

Hydraulic pressure sent to the fifth linear solenoid valve (LSE) 70*j* is pressure-regulated to control (supply) pressure of the torque converter 12 and outputted from the output port thereof, while hydraulic pressure sent to the sixth linear solenoid valve (LSF) 70*k* is applied to the spool of the line pressure-regulating valve 70*d* as a signal pressure, whereby the line pressure output from the output port of the line pressure-regulating valve 70*d* is pressure-regulated to a line command pressure.

An odd-numbered speed clutch shift valve (select valve) 70*m* is installed downstream of the first and third linear solenoid valves (LSA) 70*f* and (LSC) 70*h*. The odd-numbered speed clutch shift valve 70*m* is provided with input ports i1, i2, i3 and output ports o1, o2, o3, o4. The input port i1 is connected to the output port of the first linear solenoid valve 70*f*, the input port i2 is connected to the output port of the third linear solenoid valve 70*h*, and the input port i3 is connected to the oil passage 70*e*.

An even-numbered speed clutch shift valve (select valve) 70*n* is installed downstream of the second and fourth linear solenoid valves (LSB) 70*g* and (LSD) 70*i*. The even-numbered speed clutch shift valve 70*n* is provided with input ports i1, i2, i3 and output ports o1, o2, o3, o4. The input port i1 is connected to the output port of the second linear solenoid valve 70*g*, the input port i2 is connected to the output port of the fourth linear solenoid valve 70*i*, and the input port i3 is connected to the output port o3 of the odd-numbered speed clutch shift valve 70*m*.

Three servo shift valves (select valves), specifically, a first servo shift valve 70*o*, a second servo shift valve 70*p* and a third servo shift valve 70*q* are installed downstream of the odd-numbered speed clutch shift valve 70*m* and even-numbered speed clutch shift valve 70*n* in hydraulic pressure supply.

The first servo shift valve 70*o* is provided with input ports i1, i2, i3 and output ports o1, o2, o3, o4, o5.

The second servo shift valve 70*p* is provided with input ports i1, i2 and output ports o1, o2, o3, o4, and the third servo shift valve 70*q* is provided with input ports i1, i2, i3, i4 and output ports o1, o2, o3, o4, o5.

In the odd-numbered speed clutch shift valve 70*m*, the output port o1 is connected to the first clutch 24 and the output port o2 to the input port i2 of the first servo shift valve 70*o*, and, as stated earlier, the output port o3 is connected to the input port i3 of the even-numbered speed clutch shift valve 70*n*.

In the even-numbered speed clutch shift valve 70*n*, the output port o1 is connected to the second clutch 26, the output port o2 to the input port i1 of the first servo shift valve 70*o*, and the output port o3 to the input port i3 of the first servo shift valve 70*o*.

In the first servo shift valve 70o, the output port o1 is connected to the input port i1 of the third servo shift valve 70q, the output port o2 to the input port i2 of the third servo shift valve 70q, the output port o3 to the input port i1 of the second servo shift valve 70p, and the output port o4 to the input port i2 of the second servo shift valve 70p.

In FIG. 2, the numerals 1 to 8 above the second and third servo shift valves 70p and 70q indicate piston chambers of the 8 speed gears of the gear engaging mechanisms 60. In the second servo shift valve 70p, the output port o1 is connected to the eighth-speed piston chamber of the sixth-eighth speed gear engaging mechanism 60(6-8), the output port o2 to the sixth-speed piston chamber thereof, the output port o3 to the first-speed piston chamber of the first-third speed gear engaging mechanism 60(1-3), and the output port o4 to the third-speed piston chamber thereof.

In the third servo shift valve 70q, the output port o1 is connected to the second-speed piston chamber of the second-fourth speed gear engaging mechanism 60(2-4), the output port o2 to the fourth-speed piston chamber thereof, the output port o3 to the seventh-speed piston chamber of the fifth-seventh speed gear engaging mechanism 60(5-7), and the output port o4 to the fifth-speed piston chamber thereof, and the output port o5 is connected to the RVS clutch 58.

The odd-numbered and even-numbered speed clutch shift valves 70m and 70n, and the first to third servo shift valves 70o, 70p and 70q are individually provided with shift valves. Namely, the odd-numbered speed clutch shift valve 70m is provided with a shift valve (SHA) 70ma and the even-numbered speed clutch shift valve 70n is provided with a shift valve (SHB) 70na, while the first to third servo shift valves 70o, 70p and 70q are provided with shift valves (SHC) 70oa, (SHD) 70pa and (SHE) 70qa, respectively.

The five shift valves (SHA) 70ma, (SHB) 70na, (SHC) 70oa, (SHD) 70pa and (SHE) 70qa are all on-off solenoid valves (hydraulic control valve (electromagnetic control valves)) configured to output a signal pressure when a plunger moves from off-position to on-position in response to passage of current through (energization of) the solenoid, thereby changing the position of the associated valve spool.

More concretely, in the odd-numbered and even-numbered speed clutch shift valves 70m and 70n, when the solenoids of the shift valves (SHA) 70ma and (SHB) 70na are energized, the input ports connect with the output ports on the left side of the drawing in response to movement of the spools by the signal pressures, while when they are de-energized, the input ports connect with different output ports on the right side. Owing to this configuration, the hydraulic pressure regulated by the first linear solenoid valve (LSA) 70f or the second linear solenoid valve (LSB) 70g is supplied to the first clutch 24 or the second clutch 26, and the hydraulic pressure regulated by the third linear solenoid valve (LSC) 70h or the fourth linear solenoid valve (LSD) 70i is supplied to the servo shift valve 70o.

Further, the configuration is such that, in the first to third servo shift valves 70o, 70p and 70q, when the solenoids of the associated shift valves (SHC) 70oa, (SHD) 70pa and (SHE) 70qa are energized, the input ports connect with predetermined output ports, specifically with output ports on the left side, while when they are de-energized, the input ports connect with output ports on a different side from the aforesaid predetermined ones, specifically with output ports on the right side.

When the solenoids of the shift valves (SHA) 70ma, (SHB) 70na are energized, the input ports are connected through a backup oil passage to one of the first to third servo shift valves 70o, 70p, 70q to supply hydraulic pressure regulated by the first linear solenoid valve (LSA) 70f or the second linear solenoid valve (LSB) 70g to the gear engaging mechanisms 60.

To explain in this regard, in the odd-numbered speed clutch shift valve 70m, when the solenoid of the shift valve (SHA) 70m a is energized, the output port o4 is connected to the input port i3 of the third servo shift valve 70q, and when the solenoid of its shift valve 70q a is energized, the input port i3 is connected to the output port o4, by which configuration the clutch hydraulic pressure regulated by the first linear solenoid valve (LSA) 70f is supplied in backup fashion to the fifth-speed piston chamber of the fifth-seventh speed gear engaging mechanism 60(5-7) to establish the fifth speed.

Similarly, in the even-numbered speed clutch shift valve 70n, when the solenoid of the shift valve (SHB) 70na is energized, the output port o4 is connected to the input port i3 of the first servo shift valve 70o, and when the solenoid of its shift valve (SHC) 70oa is energized, the input port i3 is connected to the output port o5. The output port o5 of the first servo shift valve 70o is connected to the input port i1 of the second servo shift valve 70p.

When the solenoid of the shift valve (SHD) 70pa of the second servo shift valve 70p is energized, the input port i1 is connected from the output port o1 to the eighth-speed piston chamber. On the other hand, when the solenoid of the shift valve (SHD) 70pa of the second servo shift valve 70p is de-energized, the input port i1 is connected from the output port o2 to the sixth-speed piston chamber, by which configuration the clutch hydraulic pressure regulated by the second linear solenoid valve (LSB) 70g is supplied in backup fashion to the sixth-speed and eighth-speed piston chamber of the sixth-eighth speed gear engaging mechanism 60(6-8) to establish the sixth speed and eighth speed. At this time, the shift valve 70 (SHE) qa of the third servo shift valve 70q is de-energized.

Further, regarding the control of the lock-up clutch (LC) 12d of the torque converter 12, an LC control valve 70s sends the line pressure of the oil passage 70e (more exactly, hydraulic pressure obtained by depressurizing the line pressure) to an LC shift valve 70t in accordance with control pressure regulated by the fifth linear solenoid valve (LSE) 70j.

The outputs (hydraulic pressures) of the shift valves (SHA) 70ma, (SHB) 70na disposed in the odd-numbered and even-numbered speed clutch shift valves 70m, 70n are applied to the spool of the LC shift valve 70t as signal pressure to control the supply and discharge of hydraulic pressure to the lock-up clutch (LC) 12d of the torque converter 12, by which configuration the lock-up clutch 12d is on-off controlled.

More specifically, when either or both of the shift valves (SHA) 70ma, (SHB) 70na are energized, the LC shift valve 70t is controlled to the LC-off position and line pressure is supplied from the LC control valve 70s through an oil passage 12e to a backpressure chamber 12d1 of the lock-up clutch 12d, thereby controlling the lock-up clutch 12d to the off (disengaged) position.

On the other hand, when the shift valves (SHA) 70ma, (SHB) 70na are both de-energized, the LC shift valve 70t is controlled to the LC-on position and line pressure is supplied from the LC control valve 70s through an oil passage 12f to an internal pressure chamber 12d2 of the lock-up clutch 12d, thereby turning on (engaging) the lock-up clutch 12d. At this time, the amount of engagement of the lock-up clutch 12d is regulated by the LC-off position of the LC shift valve 70t dictated by the control pressure.

Returning to the explanation of FIG. 1, the transmission T is equipped with a shift controller 74. The shift controller 74 comprises an electronic control unit (ECU) equipped with a CPU, ROM, RAM and the like. Further, an engine controller 76, similarly comprising an electronic control unit equipped with a microcomputer, is installed for controlling operation of the engine 10.

The shift controller 74 is configured to communicate with the engine controller 76 and acquires various information from the engine controller 76, including engine speed NE, throttle opening TH, and accelerator position AP.

FIG. 3 shows a current supply circuit 74a for supplying current to the solenoids of the four (first to fourth) linear solenoid valves (LSA) 70f, (LSB) 70g, (LSC) 70h and (LSD) 70i, and the solenoids of the five (first to fifth) shift valves (SHA) 70ma, (SHB) 70na, (SHC) 70oa, (SHD) 70pa and (SHE) 70qa. The current supply circuit 74a is disposed in the shift controller 74. The fifth and sixth linear solenoid valves (LSE) 70j, (LSF) 70k are not shown in FIG. 3.

As illustrated, the current supply circuit 74a comprises three terminals 74a1, 74a2 and 74a3, and cut-off transistors 74a4, 74a5 and 74a6, for connecting the solenoids of the first to fourth linear solenoid valves to a battery (power source) 78. In the drawing, CPU74c denotes a current control CPU, which is configured to energize/de-energize the solenoids when supplied and not supplied with current to the bases of the cut-off transistors.

As illustrated, a conventional ignition switch (IG) 80 is interposed between the battery 78 and the three terminals 74a1, 74a2, 74a3, by which configuration the engine 10 can be started and stopped in response to an operation of a driver.

Returning to the explanation of FIG. 1, in the case of the illustrated double-clutch transmission T, when the D range is selected by the driver, hydraulic pressure is supplied to the one of the gear engaging mechanisms 60 associated with the next speed gear to once pre-engage (mesh; preshift) one of the first and second auxiliary input shaft 20, 22, and then while hydraulic pressure is discharging from the one of the first and second clutches 24, 26 on the side associated with the current speed gear, hydraulic pressure is supplied to the other of the first and second clutches 24, 26 on the side associated with the one of the first auxiliary input shafts 20, 22 corresponding to the auxiliary input shaft associated with the next speed gear to shift speeds by engaging (meshing) with the even-numbered speed input shaft 14 or the odd-numbered speed input shaft 16.

Gear-shifting is fundamentally performed alternately between odd-numbered (1, 3, 5, 7) speed gears and even-numbered (2, 4, 6, 8) speed gears. As explained above, the piston rods of the gear engaging mechanisms 60 are connected through shift forks to fork shafts, detent mechanisms having concavo-convex surfaces are machined into the fork shafts, and when driven to one of the associated speed gears or the neutral position therebetween, the shift fork engages with an indentation in the detent mechanism so as to be retained in the driven position even if supply of hydraulic pressure is stopped.

When the driver selects the P or N range, supply of current to the linear solenoid valves (LSA) 70f, (LSB) 70g is stopped (turned off) and supply of current to the shift valves (SHA) 70ma, (SHB) 70na is started (turned on), thereby establishing the P or N range.

When the driver selects the R range, supply of current to the linear solenoid valve (LSA) 70f is stopped (turned off), supply of current to the (LSB) 70g is started (turned on), supply of current to the shift valve (SHA) 70ma is stopped, and supply of current to the shift valves (SHB) 70na and (SHE) 70qa is started, thereby connecting the output port o4 of the even-numbered speed clutch shift valve 70n through an unshown oil passage to the input port i4 and output port o5 of the third servo shift valve 70q, thus supplying hydraulic pressure via that route to engage the RVS clutch 58 and establish the R range.

FIG. 4 is an explanatory diagram showing operating modes of the hydraulic pressure supply circuit 70 shown in FIG. 2.

In FIG. 4, the symbols of the linear solenoid valves (LSA) 70f, (LSB) 70g, (LSC) 70h and (LSD) 70i are abbreviated to A, B, C and D, respectively. Energization and de-energization of the shift valves (SHA) 70ma to (SHE) 70qa are indicated by symbols o and x, respectively. The symbols A, B, C and D of the "clutches" and "gear engaging mechanism" PSn (PS: piston chamber; n: speed gear) indicate that hydraulic pressure regulated by linear solenoid valve (LSA) 70f, (LSA) 70g, (LSC) 70h, (LSD) 70i and so on is supplied, and x indicates that hydraulic pressure is not supplied.

Three operating modes A, B, C are established for the case where the linear solenoid valve (LSD) 70i and (LSC) 70h are in ordinary (normal) condition and the cases where they are in failed condition. Mode A is implemented when both are in ordinary (normal) condition, mode B when the (LSD) 70i is in failed condition, and mode C when the (LSC) 70h is in failed condition.

As illustrated, in mode B, since the linear solenoid valve (LSD) 70i has failed, its output hydraulic pressure is shut off by energizing the shift valve (SHB) 70n a, and during this operation, the output hydraulic pressure of the linear solenoid valve (LSB) 70g for regulating clutch hydraulic pressure is also used in modes B5 and B7. In mode C, since the linear solenoid valve (LSC) 70h has failed, its output hydraulic pressure is shut off by energizing the shift valve (SHA) 70ma, and during this operation, the output hydraulic pressure of the linear solenoid valve (LSA) 70f for regulating clutch hydraulic pressure is also used in modes C2, C4, C6 and C8.

Engagement/disengagement and the like of the lock-up clutch 12d of the torque converter 12 is not indicated in FIG. 4.

Returning to the explanation of FIG. 1, first, second, third and fourth rotational speed sensors (operating state detector) 82, 84, 86 and 90 disposed near the idler shaft 18, first auxiliary input shaft 20, second auxiliary input shaft 22 and output shaft 28 of the transmission T respectively output a signal indicating input rotational speed NM to the transmission T from the idler shaft 18, signals indicating rotational speeds of the first and second auxiliary input shafts 20, 22, and a signal indicating rotational speed of the output shaft 28 (output rotational speed of the transmission T) NC (namely, vehicle speed V).

In the hydraulic pressure supply circuit 70 (FIG. 2), hydraulic pressure sensors 94 and 96 disposed on an oil passage connecting the output port o1 of the odd-numbered speed clutch shift valve 70m and the first clutch 24 and an oil passage connecting the output port o 1 of the even-numbered speed clutch shift valve 70n and the second clutch 26 output signals indicating the pressures (hydraulic pressures) of hydraulic oil ATF supplied to the first and second clutches 24 and 26.

A range selector position sensor 100 disposed near a range selector (not shown) installed at a driver's seat of the vehicle 1 outputs a signal indicating a range to which the driver has operated the range selector (selected range) among, for example, ranges indicated on the range selector in the order of P, R, N and D from the top down as viewed by the driver.

A stroke sensor 102 installed near the sleeve of each gear engaging mechanisms 60 outputs a signal in accordance with the operating state of the piston rod that establishes the speed gear by displacement between the neutral and in-gear (engaged) positions of the sleeve.

The outputs of these sensors are all sent to the shift controller 74. Based on these sensor outputs, plus other data obtained through communication with the engine controller 76, the shift controller 74 energizes/de-energizes the linear solenoid valve (LSA) 70f and so on so as to control the operation of the first and second clutches 24, 26 and so on, and also the gear engaging mechanisms 60, and thereby control the operation of the transmission T.

The operation of the automatic transmission control apparatus according to this embodiment, specifically the operation of the shift controller 74, will be explained next.

Figure 5:
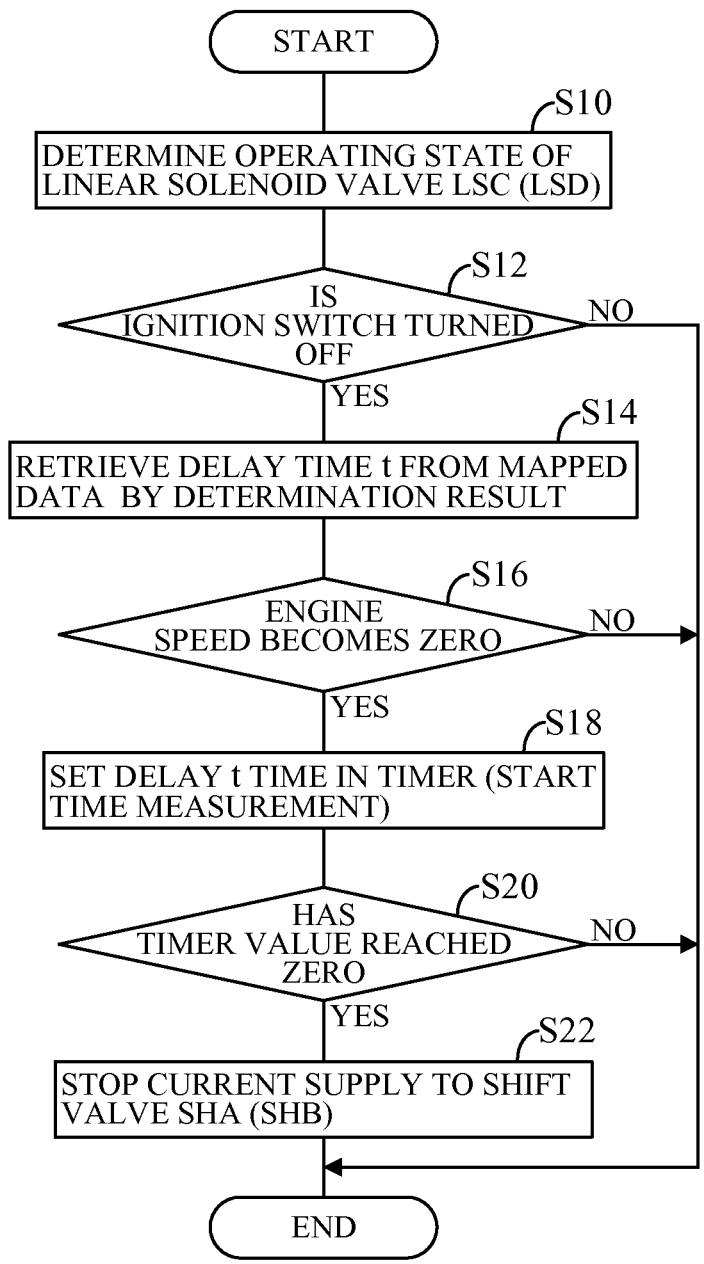
FIG. 5 is a flowchart showing the operation of the automatic transmission control apparatus according to the embodiment of this invention.

FIG. 5 is a flowchart showing the operation.

Before beginning the explanation of FIG. 5, the problem that is the focus of this invention will be reviewed. When the driver turns off the ignition switch 80, supply of current to the shift valve (SHA) 70ma, shift valve (SHB) 70na and the like is ordinarily cut off immediately, but in the case like the embodiment where the oil pump 70c is driven by the engine 10, it continues to be driven to discharge hydraulic pressure until the engine 10 stops, so that one of the gear engaging mechanisms 60 may be operated to engage the gear 32, . . . unexpectedly.

Moreover, as explained with reference to FIG. 4, when the linear solenoid valve (LSD) 70i or (LSC) 70h sustains a high-pressure abnormality or other failure, the driving mode becomes not the ordinary condition mode A but the mode B or the mode C.

For example, in the case of driving in mode B upon occurrence of a high-pressure abnormality or other failure in the linear solenoid valve (LSD) 70i, the output pressure of the linear solenoid valve (LSD) 70i is shut off by energizing the shift valve (SHB) 70na of the even-number speed clutch shift valve 70n. Or in the case of driving in mode C upon occurrence of a high-pressure abnormality or other failure in the linear solenoid valve (LSC) 70h, the output pressure of the (LSC) 70h is shut off by energizing the shift valve (SHA) 70ma of the odd-number speed clutch shift valve 70m.

When the ignition switch 80 is turned off under such a condition, if the current supply circuit 74a of FIG. 3 responds by immediately cutting off supply of current to the base terminals of the three cut-off transistors 74a4, 74a5 and 74a6 to stop supply of current to (de-energize) the solenoid valves of the shift valves (SHA) 70ma and (SHB) 70na, the mode becomes mode A in FIG. 4. As supply of current to the solenoid valves of the shift valves (SHC) 70oa, (SHD) 70pa and (SHE) 70qa is simultaneously cut off, the state becomes mode A1.

In this case, even in the state of mode A1, insofar as a normal low-pressure state continues with no high-pressure abnormality or other failure occurring in the linear solenoid valve (LSD) 70i or (LSC) 70h, no trouble arises because the hydraulic pressure supplied to the third-speed piston chamber PS3 and the fifth-speed piston chamber PS5 does not reach a sleeve driving level.

However, when one or the other of the linear solenoid valves (LSD) 70i and (LSC) 70h sustains a high-pressure abnormality, the associated sleeve is driven and a condition arises in which one or the other of the third speed and the fifth speeds may actually be established. Of particular note is that when the linear solenoid valves (LSD) 70i and (LSC) 70h both sustain high-pressure abnormality, hydraulic pressure is supplied to the third-speed piston chambers PS3 and PS5 possibly to give rise to a condition in which both the third speed and fifth speed are simultaneously, namely, a so-called "interlock" phenomenon of simultaneous engagement among multiple odd-numbered (or even-numbered) speed gears may arise. The object of embodiment is to overcome this problem.

The operation of this apparatus will be explained against the backdrop of the foregoing with reference to the flowchart of FIG. 5.

The program begins at S10, in which the operating state of the linear solenoid valve (LSC) 70h or (LSD) 70i is determined (S: processing Step). This is performed by retrieving the result of determination processing performed by a separate routine not shown in the drawings.

In the determination processing of the separate routine, the operating condition is determined, for example, by using the output of the stroke sensor 102 to determine the stroke (displacement) of the sleeve of the speed gear on the side supplied with hydraulic pressure by the linear solenoid valve (LSC) 70h or (LSD) 70i.

Specifically, whether hydraulic pressure from the linear solenoid valve (LSC) 70h or (LSD) 70i is abnormally high is discriminated by determining whether at the time the sleeve was restored from the in-gear position to the neutral position the sleeve went beyond the neutral position and overran toward the in-gear position of the speed stage on the opposite side. As shown in FIG. 2, the gears on the supplied side are 1, 3, 6 or 8 speed in the case of the linear solenoid valve (LSC) 70h and 2, 4, 5 or 7 speed in the case of the (LSD) 70i .

The program next proceeds to 512, in which it is determined whether IG OFF, i.e., whether the ignition switch 80 is turned off by the driver, and when the result is NO, the ensuing processing is skipped.

On the other hand, when the result in S12 is YES, the program proceeds to 514, in which a delay time (corresponding to the predetermined time period) t is set or determined based on the determination result, more specifically the delay time is retrieved from mapped data (characteristics) prepared in advance by the determination result.

Figure 6:
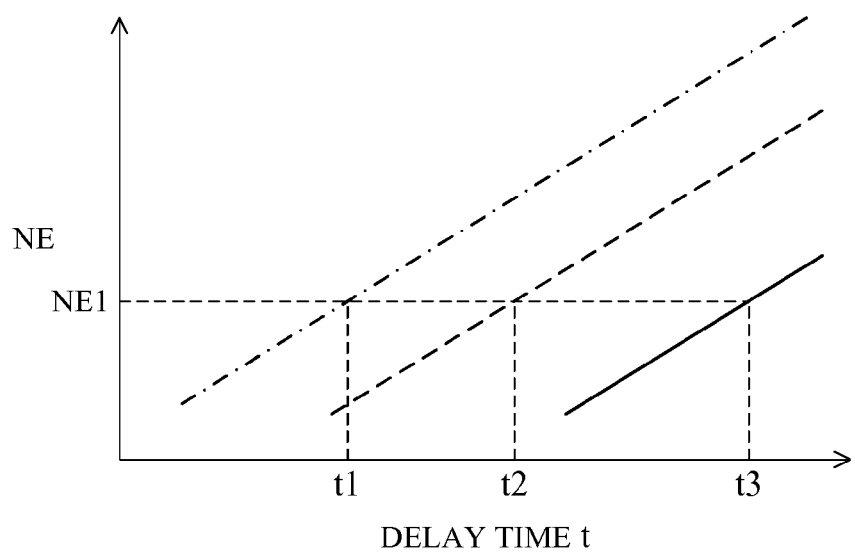
FIG. 6 is an explanatory diagram showing the characteristics a delay time referred to in the flowchart of FIG. 5.

FIG. 6 is an explanatory diagram showing the mapped data (characteristics).

As shown, the delay time t is set to be longer in proportion as the engine speed NE is higher at the time the ignition switch 80 is turned off. This is, of course, because the engine 10 takes longer to stop in proportion as the engine speed NE higher. The delay time t can also be varied in accordance with temperature, e.g., can be prolonged when the hydraulic oil temperature is very low.

During the processing of S14, the shift controller 74 communicates with the engine controller 76 to acquire the engine speed NE at the time the ignition switch 80 is turned off for use in setting the delay time t.

Moreover, the delay time t is set or determined to be longer in proportion as the engine speed NE is higher at the time of ignition switch 80 turn-off based on three sets of characteristics for the case where the linear solenoid valve (LSC) 70h and/or (LSD) 70i has sustained high-pressure abnormality (in failure), the case where a sleeve of any of the gear engaging mechanisms 60 that establishes a first to eighth speed gear is in an in-gear state, and the case where all of the gear engaging mechanisms 60 are in the neutral state.

For example, at engine speed of NE1, the delay time t is set or determined as t1 when the sleeves of the gear engaging mechanisms 60 that establish the first to eighth speeds are all in neutral state, as t2 when the sleeve of any of the gear engaging mechanism 60 that establishes the first to eighth speeds is in the in-gear state, and as t3 when the linear solenoid valve (LSC) 70*h* and/or (LSD) 70*i* has sustained high-pressure abnormality (in failure fail).

Therefore, the delay time t is set or determined to be longest when the linear solenoid valve (LSC) 70*h*, for example, has sustained a high-pressure abnormality, and although it is set shorter than this when the sleeve of the gear engaging mechanism 60 is in the in-gear state, it is still set to be longer than when the sleeve of the gear engaging mechanism 60 is in the neutral state. The reason for this is that the risk of the gear engaging mechanism 60 operating and unexpectedly engaging the gear 32, . . . increases in this order.

In addition, since residual pressure tends to increase with decreasing hydraulic oil temperature, the delay time t is also set or determined to be advisably prolonged in proportion as the temperature of the hydraulic oil is lower.

In the flowchart of FIG. 5, the program next proceeds to S16, in which it is determined whether the engine speed NE has become zero, and when the result is NO, the ensuing processing steps are skipped, and when it is YES, the program proceeds to S18, in which the defined delay time t is set in a timer to start time measurement.

Next, the program proceeds to S20, in which it is determined whether the time value has reached zero, i.e., whether the delay time t has elapsed, and when the result is NO, the remaining processing is skipped, and when it is YES, the program proceeds to S22, in which supply of current to the base terminals of the cut-off transistors 74*a*4, 74*a*6 in the current supply circuit 74*a* shown in FIG. 3 is stopped to de-energize the shift valve (SHA) 70*ma* of the odd-number speed clutch shift valve 70*m* or the shift valve (SHB) 70*na* of the even-number speed clutch shift valve 70*n*.

Figure 7A:
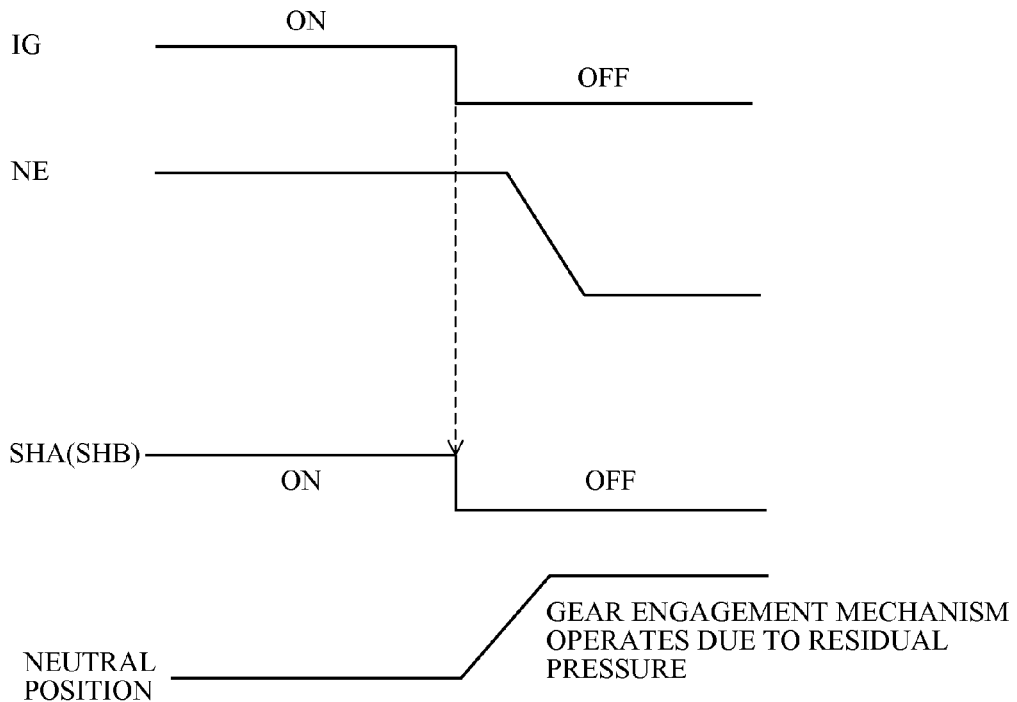
FIG. 7A and FIG. 7B are time charts for explaining the operation of the flowchart of FIG. 5.
Figure 7B:
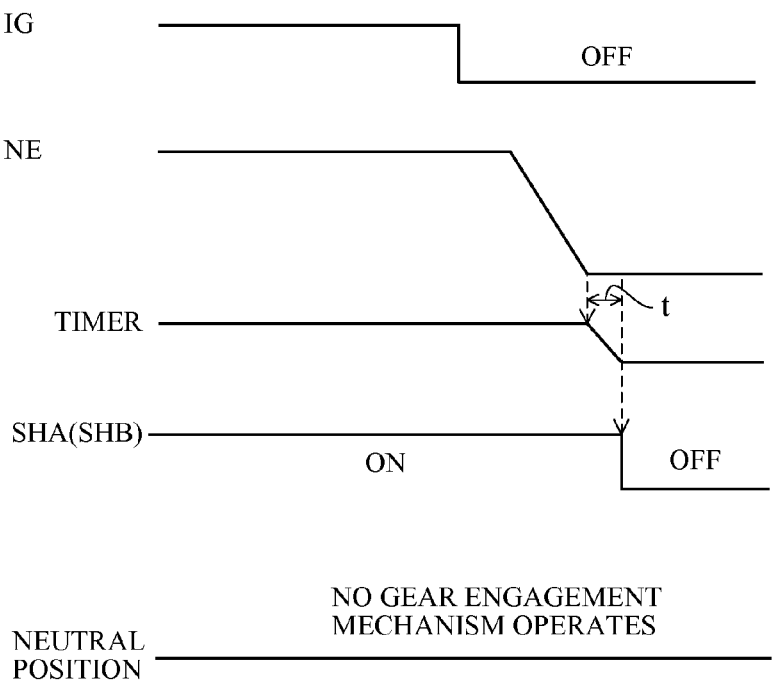

FIG. 7A and FIG. 7B are time charts for explaining the operation of the flowchart of FIG. 5.

The "Reference example" shown in FIG. 7A is for the case where supply of current to the shift valves (SHA) 70*ma* or (SHB) 70*na* is stopped immediately upon the ignition switch 80 being turned off. In this case, as stated earlier, the oil pump 70*c* continues to operate and discharge hydraulic pressure until the engine 10 stops, so that a gear engaging mechanism 60*b* may operate and engage the gear 32, . . . unexpectedly due to the residual pressure.

In contrast, in the case of the embodiment indicated by "Embodiment" in FIG. 7B, a configuration is adopted whereby when the ignition switch 80 is turned off, cut-off of current supplied to the shift valves (SHA) 70*ma* and (SHB) 70*na* through the current supply circuit 74*a* is delayed by the delay time (predetermined time period) t, so that unexpected engagement of the gear 32, . . . owing to operation of a gear engaging mechanism 60 can be avoided. Although the delay time t is variable, it can be made a fixed value while still achieving the aforesaid effect to some extent.

As stated above, the embodiment is configured to have an apparatus and method for controlling an automatic transmission (T), comprising: gear engaging mechanisms (60) installed between a prime mover (10) mounted on a vehicle (1) and driven wheels (68) to engage one of gears (32, . . . 54) so as to establish n-th speed corresponding to the engaged one of the gears, when supplied with hydraulic pressure discharged from an oil pump (70*c*) driven by the prime mover and sent through a hydraulic passage (70*e*); an electromagnetic pressure-regulating valve (70*h*, 70*i*) installed at the hydraulic passage (70*e*) to pressure-regulate the hydraulic pressure discharged from the oil pump; an electromagnetic shift valve (70*m*, 70*n*) having a solenoid valve (70*ma*, 70*na*) and installed at the hydraulic passage (70*e*) to supply the hydraulic pressure regulated by the electromagnetic pressure-regulating valve (70*h*, 70*i*) to one of the gear engaging mechanisms (60) so as to cause the one of the gears to engage to establish the n-th speed; and a current supply circuit (74*a*) connected to the solenoid valve (70*ma*, 70*na*) of the electromagnetic shift valve (70*m*), 70*n*) and a power source (78) via an ignition switch (80) to supply current to the solenoid valve (70*ma*, 70*na*); characterized by: a current supply cut-off delayer (74, S10-S18) adapted to delay cut-off of current to the solenoid valve (70*ma*, 70*na*) supplied from the current supply circuit (74*a*) by a predetermined time period, when the ignition switch is turned off. With this, by appropriately determining the predetermined time period, unexpected engagement of one of the gears 32, . . . can be avoided even when the oil pump 70*c* continues to be driven to discharge hydraulic pressure from after turn-off of the ignition switch 80 by a driver up to the time that the prime mover stops.

In the apparatus and method, the current supply cut-off delayer (74) includes: an operating state determiner (74, S10) adapted to determine operating state of the electromagnetic pressure-regulating valve (70*h*, 70*i*) through operation of the one of the gear engaging mechanisms (60); and determines the predetermined time period based on determination result of the operating state determiner.

With this, the predetermined time period can, for example, be determined differently between when the gear is in the in-gear state and when it is in the neutral state, whereby unexpected engagement of one of the gears 32, . . . can be reliably avoided.

In the apparatus and method, the current supply cut-off delayer (74) determines the predetermined time period based on determination result of the operating state determiner to be longer when the one of the gears is in in-gear state than when the one of the gears is in neutral state in the one of the gear engaging mechanisms (60).

With this, when the gear is in the in-gear state, the current can be cut off after the gear is restored to the neutral state, thereby enabling unexpected engagement of one of the gears 32, . . . to be avoided even more reliably.

The apparatus and method further includes: a prime mover rotational speed detector (76) adapted to detect rotational speed of the prime mover (10); and the current supply cut-off delayer (74) determines the predetermined time period based on detection result of the prime mover rotational speed detector to be longer with increasing rotational speed of the prime mover.

With this, the likelihood of the gear being in the in-gear state is higher than in the case when the engine rotational speed is low, the current can be cut off after the gear is restored to the neutral state, thereby enabling unexpected engagement of one of the gears 32, . . . to be avoided even more reliably.

In the apparatus and method, the current supply cut-off delayer (74) operates the electromagnetic shift valve (70*m*, 70*n*) to stop supply of the hydraulic pressure to the one of the gear engaging mechanisms (60) when the electromagnetic pressure-regulating valve (70*h*, 70*i*) connected to the one of the gear engaging mechanisms 60 is found to have sustained a high-pressure abnormality, and delays cut-off of current to the electro magnetic shift valve (70*m*, 70*n*) by the predetermined time period, whereby unexpected engagement of one of the gears 32, . . . can be avoided even more reliably.

In the apparatus and method, the electromagnetic pressure-regulating valve (70*h*, 70*i*) comprises a first electromagnetic pressure-regulating valve (70*h*) and a second electromagnetic pressure-regulating valve (70*i*), and the electromagnetic shift valve (70*m*, 70*n*) comprises a first electromagnetic shift valve (70*m*) installed at down stream of the first electromagnetic pressure-regulating valve (70*h*) in pressure supply and a second electromagnetic shift valve (70*n*) installed at down stream of the second electromagnetic pressure-regulating valve (70*i*) in pressure supply, and the current supply cut-off delayer (74) delays cut-off of current to one of the first electromagnetic shift valve (70*m*) and the second electromagnetic shift valve (70*n*) by the predetermined time period when one of the first electromagnetic pressure-regulating valve (70*h*) and the second electromagnetic shift valve (70*i*) is found to have sustained the high-pressure abnormality, whereby, in addition to the aforesaid effect, unexpected engagement of one of the gears 32, . . . can be avoided even more reliably.

In the apparatus and method, the automatic transmission comprises a double-clutch automatic transmission having input shafts (14, 16, 20, 22) that input rotation of the prime mover (10) through first and second clutches (24, 26), an output shaft (28) arranged in parallel to the input shafts, and the gear engaging mechanisms (60) in m number that engage the one of gears (32, . . . 54) to the input shafts and the output shaft to establish the one of speeds corresponding to the engaged one of the gears from among n (n: 2m) number of speeds, whereby, in addition to the aforesaid effect, unexpected engagement of one of the gears 32, . . . can be avoided even more reliably in the dual-clutch automatic transmission T.

In the above, the double-clutch transmission in the foregoing is not limited to the illustrated structure and any structure is acceptable insofar as it is equipped with the aforesaid gear engaging mechanism.

While the invention has thus been shown and described with reference to specific embodiment, it should be noted that the invention is in no way limited to the details of the described arrangement; changes and modifications may be made without departing from the scope of the appended claims.

What is claimed is:

1. An apparatus for controlling an automatic transmission, comprising:
    gears disposed between an input shaft and an output shaft;
    gear engaging mechanisms installed between a prime mover mounted on a vehicle and driven wheels to engage one of the gears so as to establish n-th speed corresponding to the engaged one of the gears, when supplied with hydraulic pressure discharged from an oil pump driven by the prime mover and sent through a hydraulic passage;
    an electromagnetic pressure-regulating valve installed at the hydraulic passage to pressure-regulate the hydraulic pressure discharged from the oil pump;
    an electromagnetic shift valve having a solenoid valve and installed at the hydraulic passage to supply the hydraulic pressure regulated by the electromagnetic pressure-regulating valve to one of the gear engaging mechanisms so as to cause the one of the gears to engage to establish the n-th speed;
    a current supply circuit connected to the solenoid valve of the electromagnetic shift valve and a power source via an ignition switch to supply current to the solenoid valve; and
    a current supply cut-off delayer adapted to delay cut-off of current to the solenoid valve supplied from the current supply circuit by a predetermined time period, when the ignition switch is turned off.

2. The apparatus according to claim 1, wherein the current supply cut-off delayer includes:
    an operating state determiner adapted to determine an operating state of the electromagnetic pressure-regulating valve through operation of the one of the gear engaging mechanisms;
    and determines the predetermined time period based on a determination result of the operating state determiner.

3. The apparatus according to claim 2, wherein the current supply cut-off delayer determines the predetermined time period based on the determination result of the operating state determiner to be longer when the one of the gears is in in-gear state than when the one of the gears is in neutral state in the one of the gear engaging mechanisms.

4. The apparatus according to claim 1, further including:
    a prime mover rotational speed detector adapted to detect a rotational speed of the prime mover;
    and wherein connected to the electromagnetic pressure-regulating valve the current supply cut-off delayer determines the predetermined time period based on a detection result of the prime mover rotational speed detector to be longer with increasing rotational speed of the prime mover.

5. The apparatus according to claim 1, wherein the current supply cut-off delayer operates the electromagnetic shift valve to stop supply of the hydraulic pressure to the one of the gear engaging mechanisms when the electromagnetic pressure-regulating valve connected to the one of the gear engaging mechanisms is found to have sustained a high-pressure abnormality, and delays cut-off of current to the electro magnetic shift valve by the predetermined time period.

6. The apparatus according to claim 5, wherein the electromagnetic pressure-regulating valve comprises a first electromagnetic pressure-regulating valve and a second electromagnetic pressure-regulating valve, and the electromagnetic shift valve comprises a first electromagnetic shift valve installed down stream of the first electromagnetic pressure-regulating valve in pressure supply and a second electromagnetic shift valve installed down stream of the second electromagnetic pressure-regulating valve in pressure supply, and the current supply cut-off delayer delays cut-off of current to one of the first electromagnetic shift valve and the second electromagnetic shift valve by the predetermined time period when one of the first electromagnetic pressure-regulating valve and the second electromagnetic shift valve is found to have sustained the high-pressure abnormality.

7. The apparatus according to claim 1, wherein the automatic transmission comprises a double-clutch automatic.

8. A method for controlling an automatic transmission, having:
    gears disposed between an input shaft and an output shaft;
    gear engaging mechanisms installed between a prime mover mounted on a vehicle and driven wheels to engage one the of gears so as to establish n-th speed corresponding to the engaged one of the gears, when supplied with hydraulic pressure discharged from an oil pump driven by the prime mover and sent through a hydraulic passage;
    an electromagnetic pressure-regulating valve installed at the hydraulic passage to pressure-regulate the hydraulic pressure discharged from the oil pump;

an electromagnetic shift valve having a solenoid valve and installed at the hydraulic passage to supply the hydraulic pressure regulated by the electromagnetic pressure-regulating valve to one of the gear engaging mechanisms so as to cause the one of the gears to engage to establish the n-th speed; and a current supply circuit connected to the solenoid valve of the electromagnetic shift valve and a power source via an ignition switch to supply current to the solenoid valve;

wherein the method comprises the steps of:

delaying cut-off of current to the solenoid valve supplied from the current supply circuit by a predetermined time period, when the ignition switch is turned off.

9. The method according to claim 8, wherein the step of current supply cut-off delaying includes the step of:

determining an operating state of the electromagnetic pressure-regulating valve through operation of the one of the gear engaging mechanisms;

and determines the predetermined time period based on a determination result of the operating state determiner.

10. The method according to claim 9, wherein the step of current supply cut-off delaying determines the predetermined time period based on the determination result of the step of operating state determining to be longer when the one of the gears is in in-gear state than when the one of the gears is in neutral state in the one of the gear engaging mechanisms.

11. The method according to claim 8, further including the step of:

detecting rotational speed of the prime mover;

and the step of current supply cut-off delaying determines the predetermined time period based on a detection result of the step of prime mover rotational speed detecting to be longer with increasing rotational speed of the prime mover.

12. The method according to claim 8, wherein the step of current supply cut-off delaying operates the electromagnetic shift valve to stop supply of the hydraulic pressure to the one of the gear engaging mechanisms when the electromagnetic pressure-regulating valve connected to the one of the gear engaging mechanisms is found to have sustained a high-pressure abnormality, and delays cut-off of current to the electro magnetic shift valve by the predetermined time period.

13. The method according to claim 12, wherein the electromagnetic pressure-regulating valve comprises a first electromagnetic pressure- regulating valve and a second electromagnetic pressure-regulating valve, and the electromagnetic shift valve comprises a first electromagnetic shift valve installed down stream of the first electromagnetic pressure-regulating valve in pressure supply and a second electromagnetic shift valve installed down stream of the second electromagnetic pressure-regulating valve in pressure supply, and the step of current supply cut-off delaying delays cut-off of current to one of the first electromagnetic shift valve and the second electromagnetic shift valve by the predetermined time period when one of the first electromagnetic pressure-regulating valve and the second electromagnetic shift valve is found to have sustained the high-pressure abnormality.

14. The method according to claim 8, wherein the automatic transmission comprises a double-clutch automatic transmission.

* * * * *